Patented May 16, 1950

2,507,574

UNITED STATES PATENT OFFICE 2,507,574

AMINO - ANTHRAQUINONE - CARBOXYLIC - AMIDE DYES AND THEIR MANUFACTURE

Henry Charles Olpin and Kenneth Ronald House, Spondon, near Derby, England, assignors to Celanese Corporation of America, a corporation of Delaware No Drawing. Application July 31, 1946, Serial No. 687,530. In Great Britain August 21, 1945

10 Claims. (Cl. 260—377)

This invention relates to improvements in the production of dyestuffs and in processes of colouration, and is more particularly concerned with the provision of new anthraquinone dyestuffs suitable for colouring cellulose acetate and other cellulose esters and ethers and processes and compositions for colouring said materials.

It has been found that unsulphonated anthraquinone-2-carboxylic amides containing amino groups in the 1- and 4- positions, one of the said amino groups carrying a halogenated phenyl substituent while the other may be either unsubstituted or may carry an alkyl, (including an oxyalkyl or other substituted alkyl), substituent, form a very valuable series of dyestuffs for cellulose acetate and other cellulose esters and ethers. The invention is concerned with processes for producing these new dyestuffs and for using them for colouring the cellulose derivative materials.

The new dyestuffs, which are generally blue in shade, are slightly redder than the corresponding dyestuffs containing an unhalogenated phenyl group attached to one of the amino groups, and therefore represent a valuable addition to the available shades. Moreover, while having a sufficient affinity for cellulose acetate for practical purposes, they show an extraordinarily high resistance to the type of fading brought about by the combustion products of coal gas, and in this respect are superior to the analogous dyestuffs containing the unhalogenated phenyl group. The most valuable dyestuffs for the purpose of the present invention are those having the formula

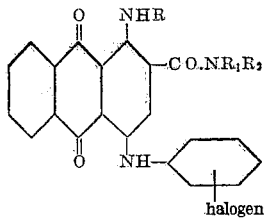

wherein R, R$_1$ and R$_2$ may be hydrogen or alkyl, including oxyalkyl. With dyestuffs containing oxyalkyl groups, it is preferable that only one of the three groups R, R$_1$ and R$_2$ be oxyalkyl. As halogen in the phenyl group it is preferable to employ chlorine.

The invention includes the following methods (designated A and B respectively) of making the new dyes:

(A) An anthraquinone derivative containing the desired 2-carboxy-amide group and one of the required amino substituents and having a halogen atom in para position to the existing amino substituent—is treated with the appropriate amine so as to replace the halogen atom by the other required amino substituent. In particular a 1-amino or 1-alkylamino-4-brom-anthraquinone-2-carboxylic amide or alkylamide may be allowed to react with the requisite halogenated aromatic amine, for example, o-, m- or p- chlor or bromaniline or 4-chlor-2-amino-1-methyl benzene, or 2-chlor-4-amino-1-methoxy-benzene. In general the reaction is facilitated by the presence of copper acetate. Again a 1-halogenphenylamino-4-halogen-anthraquinone-2-carboxylic amide may be subjected to the action of ammonia or a primary aliphatic amine, for example methylamine, ethanolamine, beta-hydroxypropylamine or beta-cyano-ethylamine, so as to replace the 4-bromine atom by amino or aliphatically substituted amino. For example the 1-(bromphenylamino)-4-brom anthraquinone - 2 - carboxylic - oxyethylamide obtainable by brominating 1 - p - bromphenylamino - anthraquinone-2-carboxylic - oxyethylamide may be subjected to the action of ammonia, methylamine, or beta-cyanoethylamine.

(B) An anthraquinone derivative differing from the required dye by the presence of a carboxylic chloride group in place of the carboxylic amide group is subjected to the action of the ammonia or amine appropriate to convert the carboxylic chloride group into the required carboxylic amide group. Thus a 1-amino- or 1-alkylamino - 4 - halogenphenylamino-anthraquinone-2-carboxylic chloride may be subjected to the action of ammonia or a primary or secondary aliphatic amine, for example mono methylamine, dimethylamine, mono-ethanolamine, beta-hydroxy-propylamine, or beta-cyanoethylamine.

The dyes can also be produced by various other methods which, though chemically equivalent in the sense that they yield the same products, are in general far less convenient or satisfactory than methods (A) and (B) outlined above.

For example method (A) may be modified by using as material to react with the amine, an anthraquinone 2-carboxyamide derivative containing instead of the nuclear halogen atom, another substituent capable of being replaced by an amino or substituted amino group by the action of ammonia or an amine, for example a nitro group, an alkoxy group, or an aryloxy group. Again method (B) may be modified by using an anthraquinone compound containing, in place of the carboxylic chloride group specified, another group capable of being converted into the required carboxylic amide group by the action of ammonia or an amine, for example a carboxylic bromide group or a carboxylic ester group.

Another method of making the 1-amino-4-halogenphenylamino-anthraquinone-2-carboxylic amides is to reduce the nitro group of the corresponding compound containing a nitro group in place of the amino group.

A still further method of making those dyes of the invention in which the carboxylic amide group does not carry a substituent is to subject the corresponding compound having a cyano group in place of the carboxylic amide group to hydrolysis, for example with fairly concentrated sulphuric acid, so as to convert the cyano group into a carboxylic amide group.

The invention includes both the manufacture of the new dyestuffs and the dyeing of cellulose acetate or other cellulose esters or ethers therewith. For this purpose the dyestuffs are advantageously applied to the materials in the form of aqueous dispersions which can be prepared in any convenient way, for example with the aid of dispersing agents and/or protective colloids. The invention includes preparations, and particularly concentrated preparations, for this purpose, e. g. in powder, paste or other form, comprising the new dyestuffs together with the dispersing agents and/or protective colloids. Apart from cellulose acetate itself, the new dyestuffs are valuable, for example, for dyeing cellulose propionate, cellulose butyrate, cellulose aceto-propionate and aceto-butyrate and ethyl and benzyl celluloses.

Dyestuffs containing oxyalkyl groups, for example attached to the amino group in the 1-position or attached to the nitrogen atom in the 2-carboxylic amide group, may be converted into acid sulphuric esters which also have an affinity for cellulose derivative materials and/or for wool and natural silk. The conversion to the sulphuric esters may be effected by treatment with highly concentrated sulphuric acid, chlorsulphonic acid in the presence of pyridine or other tertiary base, or other suitable sulphating agents.

The invention is illustrated by the following examples, the parts referred to being by weight.

*Example 1*

40 parts of 1-amino-4-brom-anthraquinone-2-carboxy-methylamide are stirred with 20 parts of potassium acetate, 0.4 part of copper acetate and 160 parts of meta-chloraniline while heating at 140 to 145° C. for 5 hours. The mixture is then allowed to cool and is poured into dilute hydrochloric acid to precipitate the dyestuff which is then washed well with water.

The shade produced by this 1-amino-4-meta-chlor - phenylamino-anthraquinone - 2 - carboxy-methylamide on cellulose acetate is slightly redder than that of the dyestuff produced from aniline, and in addition the dyeing shows a higher resistance to acid fading. Its light resistance is very high.

*Example 2*

20 parts by weight of 1-amino-4-brom-anthraquinone-2-carboxy-ethanolamide, 10 parts of potassium acetate, 0.25 part of copper acetate and 80 parts of ortho-chlor-aniline are heated while stirring at 130–140° C. for 3½–4 hours.

Upon cooling, the 1-amino-4-ortho-chlor-anilido - anthraquinone-2-carboxy-ethanolamide crystallises out. Applied to cellulose acetate fabric from an aqueous dispersion it yields blue shades which are slightly redder than those yielded by the corresponding anilido compound and have a better resistance to combustion products of coal gas. The fastness to light is excellent the dyeings, even in pale shades, being substantially unaffected by 200 hours exposure in the carbon-arc fadeometer.

*Example 3*

The preparation according to Example 2 is carried out in exactly the same manner but using meta-chlor-aniline instead of ortho-chlor-aniline. The dyestuff, after crystallisation and filtration, is recrystallised from methylated spirits. Again the dyestuff is slightly redder than that produced from aniline. It has a somewhat higher affinity for cellulose acetate and a somewhat better resistance to combustion products of coal gas than the corresponding dyestuff from ortho-chlor-aniline prepared according to Example 2 above; its fastness to light is of the same excellence as the dye of Example 2.

*Example 4*

16 parts of 1-ethanolamino-4-brom-anthraquinone-2-carboxy-methylamide are boiled under reflux for 1½ hours with 8 parts of potassium acetate, 0.2 part of copper acetate, 48 parts of amyl alcohol, and 30 parts of meta-chloraniline. After allowing to stand to crystallise, the resulting dye is filtered off and washed first with methylated spirit and then with water. From an aqueous dispersion it dyes cellulose acetate in blue shades of very good resistance to light and combustion products of coal gas.

*Example 5*

5 parts of the finely powdered acid chloride of 1-amino-4-meta-chlor - phenylamino-anthraquinone-2-carboxylic acid are stirred for two hours at ordinary temperature with 60 parts of aqueous monoethanolamine of 30 per cent strength. The resulting 1-amino - 4 - meta-chlorphenylamino-anthraquinone-2-carboxylic ethanolamide is filtered off, washed well with water and dried.

Having described our invention, what we desire to secure by Letters Patent is:

1. Process for the production of an anthraquinone derivative consisting of anthraquinone having in the 1-position a group —NHR, in the 2-position a group —CONR$_1$R$_2$, and in the 4-position a chloro-phenylamino group wherein R, R$_1$ and R$_2$ are selected from the group consisting of hydrogen, unsubstituted alkyl groups containing up to three carbon atoms and hydroxyalkyl groups containing up to three carbon atoms and at most one of R, R$_1$ and R$_2$ is a hydroxyalkyl group, which comprises subjecting to the action of a chlorophenylamine an anthraquinone derivative differing from the foregoing anthraquinone derivative by having a halogen atom in place of the chlorophenylamino group.

2. An anthraquinone derivative consisting of anthraquinone having in the 1-position a group —NHR, in the 2-position a group —CONR$_1$R$_2$, and in the 4-position a chloro-phenylamino group, wherein R, R$_1$ and R$_2$ are selected from the group consisting of hydrogen, unsubstituted alkyl groups containing up to three carbon atoms and hydroxyalkyl groups containing up to three carbon atoms and at most one of R, R$_1$ and R$_2$ is a hydroxyalkyl group.

3. 1-amino - 4 - o-chlor-phenylamino - anthraquinone-2-carboxylic methylamide.

4. 1-amino-4-m-chlorphenylamino-anthraquinone-2-carboxylic methylamide.

5. 1-amino-4-m-chlorphenylamino-anthraquinone-2-carboxylic-hydroxyethylamide.

6. Process for the production of 1-amino-4-o-chlorphenylamino - anthraquinone-2-carboxylic-methylamide, which comprises subjecting 1-amino - 4 - brom-anthraquinone - 2 - carboxylic-methylamide to the action of o-chloraniline.

7. Process for the production of 1-amino-4-m-chlorphenylamino - anthraquinone-2-carboxylic-methylamide, which comprises subjecting 1-amino - 4 - brom-anthraquinone - 2 - carboxylic-methylamide to the action of m-chloraniline.

8. Process for the production of 1-amino-4-m-chlorphenylamino - anthraquinone-2-carboxylic-hydroxy-ethylamide, which comprises subjecting 1-amino-4-brom-anthraquinone - 2 - carboxylic-hydroxy-ethylamide to the action of m-chloraniline.

9. An anthraquinone derivative consisting of anthraquinone having in the 1-position an $NH_2$ group, in the 2-position a $CONHCH_3$ group and in the 4-position a chlorophenylamino group.

10. An anthraquinone derivative consisting of anthraquinone having in the 1-position a group $NHR$, in the 2-position a group $CONR_1R_2$ and in the 4-position a mono-chlorophenylamino group wherein $R$, $R_1$ and $R_2$ are selected from the group consisting of hydrogen, unsubstituted alkyl groups containing up to three carbon atoms and hydroxy-alkyl groups containing up to three carbon atoms and at most one of $R$, $R_1$ and $R_2$ is a hydroxyalkyl group.

HENRY CHARLES OLPIN.
KENNETH RONALD HOUSE.

REFERENCES CITED

The following references are of record in the file of this patent:

UNITED STATES PATENTS

| Number | Name | Date |
|---|---|---|
| 2,059,476 | Nawiasky et al. | Nov. 3, 1936 |
| 2,236,672 | Coffey et al. | Apr. 1, 1941 |
| 2,294,968 | Ellis et al. | Sept. 8, 1942 |

FOREIGN PATENTS

| Number | Country | Date |
|---|---|---|
| 324,311 | Great Britain | 1929 |